US Patent [19] 4,252,849
Nishimura et al. [45] Feb. 24, 1981

[54] HEAT SHRINKABLE COVERS

[75] Inventors: Hiroshi Nishimura; Tetsuo Monma, both of Yokohama; Yoshio Hayamizu; Katumi Kimura, both of Goi, all of Japan

[73] Assignees: Ube Industries, Ltd., Ube; The Furukawa Electric Co., Ltd., Tokyo, both of Japan

[21] Appl. No.: 95,599

[22] Filed: Nov. 19, 1979

[30] Foreign Application Priority Data

Nov. 25, 1978 [JP] Japan .................................. 53/161546

[51] Int. Cl.³ ............................................ B32B 23/02
[52] U.S. Cl. .................................... 428/192; 428/516; 428/913
[58] Field of Search ............... 428/192, 910, 913, 113, 428/108, 292, 295, 157, 177, 516; 264/230

[56] References Cited

U.S. PATENT DOCUMENTS

| 3,086,242 | 4/1963 | Cook et al. | 264/230 |
| 3,655,503 | 4/1972 | Stanley et al. | 428/172 |
| 4,084,028 | 4/1978 | Rasmussen | 428/113 |
| 4,085,286 | 4/1978 | Horsma et al. | 428/913 |

Primary Examiner—William J. Van Balen
Attorney, Agent, or Firm—Charles E. Pfund

[57] ABSTRACT

A heat shrinkable synthetic resin cover is made of a rectangular sheet shaped cross-linked polymer. A flexible electric heater covered by a cross-linked polymer is contained in a heat shrinkable synthetic resin member so that the electric heater crosses at right angles to an inherent direction of heat shrink of the member so as not to prevent inherent heat shrink thereof. Further, a pair of tongues are provided along each end edge of the heat shrinkable synthetic resin member. When the cover is applied to seal a joint between two pipes or electric cables, the tongues on the opposite end edges are superposed one upon another to interconnect both end edges of the cover.

7 Claims, 3 Drawing Figures

HEAT SHRINKABLE COVERS

BACKGROUND OF THE INVENTION

This invention relates to a heat shrinkable synthetic resin cover containing a heat generating element and adapted for use as an anticorrosion coating member applied to conduit joints, and a protective coating member for the joints of electric wires and cables.

Heat shrinkable synthetic resin covers have been widely used for protection against corrosion and mechanical impact of joints of natural gas or petroleum pipelines or joints of wires or cables. For example, after being applied about a joint of steel pipes or electric wires or cables, a sheet or tube-shaped heat shrinkable synthetic resin cover is heated from outside with the flame of a gas burner to shrink so as to fit and adhere tightly to the joint.

Examples of such heat shrinkable covers used at such joints are described in Japanese Preliminary publication of patent No. 119,684 of 1977 (corresponding to U.S. Patent Application 5 filed on March 5, 1976, now abandoned) and U.S. Pat. No. 3,086,242.

According to the prior art of coating a joint, when a heat shrinkable synthetic resin cover is applied about the joint, a suitable external source of heat is required to shrink the cover. Unless the heat shrinkable cover so applied is uniformly heated about the entire periphery, there are such problems as non-uniform shrinkage causing air voids and uneven thickness of the cover. Although such coating operations are generally performed in the field, use of a heating furnace is not suitable for the field work so that in most cases gas burners have been used. With the gas burner it is generally difficult to heat uniformly all the periphery at the same time.

For example, when a heat shrinkable cover is wrapped about a joint of pipes having an outer diameter larger than one meter, the area of the cover heated at a time by a LPG gas burner is relatively narrow so that, it is impossible to uniformly heat the entire surface of the cover. In order to uniformly heat the entire surface, it is necessary to use a special multiple head burner or to simultaneously perform the heating operation with many skilled operators.

Where the field is in extremely cold areas or windy areas, it has been impossible to uniformly and simultaneously heat the entire surface of the heat shrinkable cover with external heating means. Nonuniform heating results in destruction of the cover due to overheating or an insufficient bonding between the joint and the cover thus forming an air gap therebetween or nonuniform wall thickness of the cover. Thus, as it is impossible to maintain the corrosion proof property at the joints over a long period, and since nonuniform heating results in nonuniform residual stress in the coating the durability and weather proofness of the coated layer degrade thus making it impossible to use it over a long period.

In order to solve the problem as described above, the inventors have proposed one solution in the U.S. patent application with a Ser. No. 68,761 entitled "Heat Shrinkable Covers", which was filed on Aug. 23, 1979 claiming the Convention priority from the Japanese patent applications No. 53-106199 and No. 53-106200 filed on Sept. 1, 1978.

According to said prior invention, there is provided a heat shrinkable synthetic resin cover of such a type as sheet or tube which comprises a heat shrinkable synthetic resin member, and a flexible electric heating member coated with a cross-linked polymer is embedded in the heat shrinkable synthetic resin member so that the electric heating member does not preclude heat shrinkage of the heat shrinkable synthetic resin member in a direction inherent thereto. Further, the heat shrinkable rectangular synthetic resin member used in this invention is made of a polymer, and an electric heating wire is distributed therein in a zig-zag configuration so that it crosses substantially at right angles to an inherent direction of heat shrink of heat shrinkable synthetic resin member.

The present invention, therefore, aims at the improvement of the prior invention that the inventors proposed in the past.

SUMMARY OF THE INVENTION

Accordingly, it is an object of this invention to provide a sheet shaped shrinkable cover wherein the opposite ends of the cover wrapped about a joint can be firmly joined to each other. In addition to the effects, obtainable by said prior invention by the inventors, (1) the cover can be uniformly heated from inside by passing electric current through the heater without using any external heating source; (2) the cover can be used readily in extremely cold regions and applied to the joint of pipes having large diameter, and (3) the cover can be uniformly heated and shrunk to give a durable and weather proof protection to pipe joints.

According to the present invention, therefore, there is provided an improved heat shrinkable synthetic resin cover wherein a pair of tongues are provided along each end edge of the heat shrinkable synthetic resin member. When the cover is applied to seal a joint between two pipes or electric cables, the tongues on the opposite end edges are superposed one upon another to interconnect both edges of the cover.

DESCRIPTION OF THE PREFERRED EMBODIMENT

Figure 1:
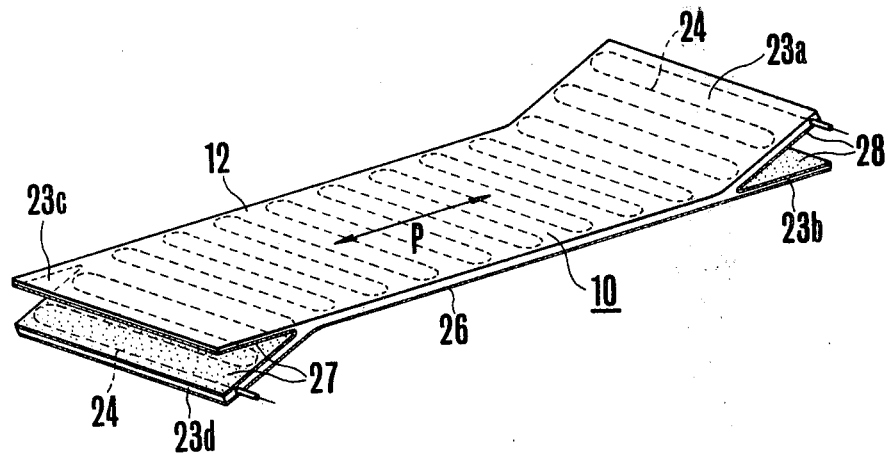
FIG. 1 is a perspective view showing an embodiment of the sheet like heat shrinkable synthetic resin cover embodying the invention.

FIG. 1 shows an embodiment of a heat shrinkable cover according to the present invention. The heat shrinkable synthetic resin member 12 constituting the heat shrinkable cover 10 is a flat rectangular sheet, which is formed of a resinous shaped material shrinkable in substantially one direction, and the resin 12 may be improved in heat resistant property at high temperatures and heat shrinkability if the material is made of a cross-linked polymer. The heat shrinkable member 12 may be a crystalline synthetic resin film imparted with heat shrinkability substantially in one direction by a well known method.

The heat shrinkable crystalline synthetic resin film or sheet may be prespared by a conventional method comprising the steps of drawing a blank of the film in substantially one direction at an elevated temperature and then lowering the temperature under a tension load caused by the elongation so as to solidify the film with stress remaining in the film.

Heat resistant property of the film can be imparted by cross-linking a polymer with a cross-linking agent or by electron beams or radioactive radiations. Such cross-linking reaction may be effected before or after the step of imparting the heat shrinkability to the film.

The heat shrinkable synthetic resin member 12 may comprise a single layer or a laminate which have been imparted with the heat shrinkability and heat resistance property in the manner described above.

The lamination may be prepared, for example, by tightly wrapping a film 12 which has been imparted with heat shrinkability and heat resistant property about a roller in a desired thickness, applying a shape holding tape or sheet about the lamination, and heating the assembly thereby fusing together all layers of the lamination to form a integral lamination.

The film utilized to prepare the heat shrinkable and heat resistant member may be made of a crystalline resin, but it is advantageous that the film is composed of a polymer having a gel fraction of 20 to 65%, preferably 25 to 60%, and selected from a group consisting of cross-linked ethylene polymers, for example, cross-linked polyethylene, cross-linked polyvinyl chloride, silicone rubbers, ethylene-propylene copolymer elastmers. It was found that films made of cross-linked polyethylene having a gel fraction of 30 to 50% are most suitable.

The term gel fraction used herein means weight percent of residual obtained from 0.15 gr. of the sample after a 24-hour extraction at 120° C. with 30 ml. of xylene and drying for more than 16 hours at 80° C.

The heat shrinkable synthetic resin member made of a cross-linked polymer having a gel fraction or a solvent unextractable fraction of less than 20% is not suitable because of its poor heat shrinkability and poor heat resistant property. With such a member it is not easy to obtain heat shrinkable covers that are uniform in thickness and do not break when exposed to high temperature. Films made of polymers having a gel fraction of larger than 65% was also found to be unsuitable because of their poor bonding force between the layers when a lamination of the heat shrinkable synthetic resin members is formed.

As above described, the heat shrinkable film is prepared by drawing the blank in one direction at high temperature and then cooling the elongated film, and such film has sufficient heat shrinkability substantially in one or inherent direction so that it is suitable to prepare the heat shrinkable member of this invention. When laminating such films, care should be taken to align the direction of shrinking (inherent direction of heat shrink P) of respective films for the purpose of ensuring a heat shrinkable member which shrinks substantially in only one direction when heated.

In the following description, the direction designated as P is the direction of the films, which coincides with the drawn direction.

According to this invention the heat shrinkable synthetic resin cover 10 contains therein an electric heater 24 comprising a flexible conductor coated with a cross-linked polymer. Use of a cross-linked polymer is advantageous because it can maintain the electric conductor in good insulated state when a high temperature is applied to laminate the electric heater 24 with heat shrinkable synthetic resin members 12 and when a high temperature is applied to shrink the heat shrinkable cover 10 applied to a pipe or cable joint.

The cross-linked polymer may be formed by cross-linking thermoplastic resins, for example, ethylene polymers with electron beams or radioactice radiations or chemical cross-linking agents, for example peroxides or suitable curing agents. The cross-linking reaction may be performed before or after coating the conductor with the thermoplastic resin.

Preferably, the degree of cross-linking of the thermoplastic resin utilized to insulate the conductor may be 20–60%, preferably 25–55%, more preferably 30–45% in terms of the gel fraction. It was found that a cross-linked polyethylene having a gel fraction of 25–55% is most suitable for insulating the conductor.

When the gel fraction of the cross-linked polymer is higher than 60%, and when the insulated conductor is inserted between two heat shrinkable synthetic resin members 12 in a manner to be described later, it is difficult for the insulated conductor to be fused with the members 12 to form an integrated structure. On the other hand, when the gel fraction is lower than 20%, the heat resistant property of the cross-linked polymer is not sufficient and it may melt to flow and cause short circuit between the conductors.

The flexible conductor may be a fine metal wire or strands thereof which can generate heat when current flows therethrough. Fine copper wire or strands thereof are most suitable, but wires of copper alloys or nickel alloys can also be used depending upon the manner of heat shrink.

Use of a flexible conductor insulated with a cross-linked polymer as the electric heater 24 constitutes one of important features of this invention.

One of the advantages of such a conductor is that the flexibility permits it to be distributed in a desired uniform density in the heat shrinkable synthetic resin cover 10, irrespective of the shape of the conductor. Furthermore, the flexibility of the conductor assures the flexibility of the heat shrinkable synthetic resin cover 10 both at room temperature and at elevated temperature.

In case a bare conductor not coated with a cross-linked polymer is used as an electric heater wire, when heat is applied to lamination of the heat shrinkable synthetic resin members 12 or to cause the heat shrinkable cover 10 to shrink about the joint, the bare conductor tends to move, causing adjacent turns to contact or overlap with each other and therefore short circuiting or breakage of the wire. If such fault occurs, a portion or all of the conductor can not pass current thus causing nonuniform heat shrink of the cover 10.

In contrast, according to this invention, since the conductor is coated with a cross-linked polymer, the conductor would not be displaced to cause short circuit or breakage when heat is applied to the laminated heat shrinkable members 12 or to the heat shrinkable cover 10.

Even when the cross-linked polymer utilized to insulate the conductor is heated to a temperature higher than the softening point of the polymer to cause the cover 10 to heat shrink, the coated polymer would not melt because its heat resistance property has been increased due to the cross-linking reaction. Accordingly, variation in the thickness of the coated polymer is small thus making it possible to complete the heat shrink in a short time and at a high temperature.

Where a cross-linked polyethylene having a gel fraction of 30–45% is used to insulate the conductor the cross-linked polymer well adheres to the heat shrinkable synthetic resin members when they are laminated thus preventing formation of air voids in the lamination whereby it is possible to provide an integral homogeneous lamination having a high heat resistant property.

As shown in FIG. 1 the flexible electric heater 24 should be contained throughout the heat shrinkable cover 10 such that the electric heater should not prevent the heat shrink of the heat shrinkable members 12 in its inherent direction of heat shrink P.

The flexible heater 24 may be contained in various manners in the heat shrinkable cover 10. For example, the conductor may be arranged to cross the inherent direction P in which the maximum heat shrink of the members 12 occurs.

Advantageously, the conductor should be densely and uniformly arranged between the members 12 in such a manner that the conductor intersects the direction P at an angle between 60° and 90°. Thus, it is advantageous to dispose the conductor so that it would not extend in parallel with the inherent direction P of the heat shrink of the members 12 for a substantial length.

It is advantageous to arrange the conductor to cross the inherent direction P of heat shrinkage of the members 12 at substantially right angles with a spacing of 0.3–2 cm, preferably 0.4–1 cm between adjacent turns.

When a long conductor between the heat shrinkable members 12 is arranged in a zig-zag pattern it is desirable that the reversing point is off the edges of the sheet because sufficient heat is applied at both edge portions as well as at the central portion.

If the heating member 24 comprises a single long conductor, the resistance would become too high to permit the flow of current necessary to generate sufficient heat, so that it is desirable to divide the conductor into a plurality of sections and connect them in parallel.

The heat shrinkable cover 10 containing a heating member 24 is provided with at least one pair of terminals extending to the outside of the cover to pass electric current through the conductor. As above described, where the conductor is divided into a plurality of sections which are connected in parallel, a corresponding number of the terminal pairs are provided.

The heat shrinkable cover 10, that is the heat shrinkable members 12 may have any desired configuration so long as they can accommodate the heating member 24 in a prescribed manner. The heat shrinkable members 12 are preferred to have a rectangular sheet or tubular form because of their easiness of manufacturing and application to a joint between pipes or cables. Especially, heat shrinkable cover 10 (FIG. 1) comprising flat sheet shaped heat shrinkable synthetic resin members 12 is easy to wrap about joints between large diameter steel pipes already installed.

It is advantageous to apply a suitable bonding agent 26 to one surface of the heat shrinkable cover 10 which is to be brought into contact with the joint for increasing the bonding force between the cover and the pipes or cables. As the bonding agents may be mentioned pressure sensitive bonding agents and heat sensitive bonding agents. However, the heat sensitive bonding agents may prefer to the pressure sensitive agents and both the agents may be of a crosslinkable composition such as rubber system or thermosetting system resins.

Preferably, the thickness of the heat shrinkable cover 10 of this invention may be about 0.5 to 5 mm.

The feature of the invention is to provide at least two tongues 23a, 23b or 23c, 23d (not bonded portions) at least one end edge of the heat shrinkable cover 10 which extend preferably in the direction of heat shrink P, such tongues being used to firmly bond together overlapped ends of the cover 10 when it is wrapped about a joint between steel pipes or cables.

Figure 2:
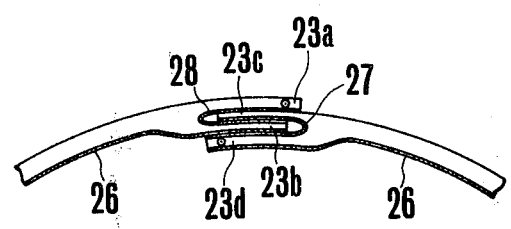
FIG. 2 is a side view of a sheet like heat shrinkable cover shown in FIG. 1 to be applied to a joint between steel pipes with the opposite ends of the cover bonded together.

In the example shown in FIG. 1, the opposite end edges of shrinkable synthetic resin members 12 have diverged tongues 23a–23d which are to be superposed one upon another as shown in FIG. 2 to reinforce the junction of the cover. It is advantageous to apply suitable bonding agents 27, 28 onto the inner surfaces of the tongues.

Where the heating element 24 is uniformly contained in the tongues and body portion of the heat shrinkable members 12 and in one of the tongues on the opposite ends, for example in tongues 23a and 23d, after the cover 10 has been wrapped about the joint and after the tongues have been superposed one upon another as shown in FIG. 2, passage of current through the heating element 13 not only causes the cover 10 to heat shrink but also causes film bonding of the tongues. When wrapping the heat shrinkable cover as above described the tongues should be overlapped so that tongues 23a and 23d each containing the heating element 24 would be located at the innermost or outermost positions (see FIG. 2).

Figure 3:
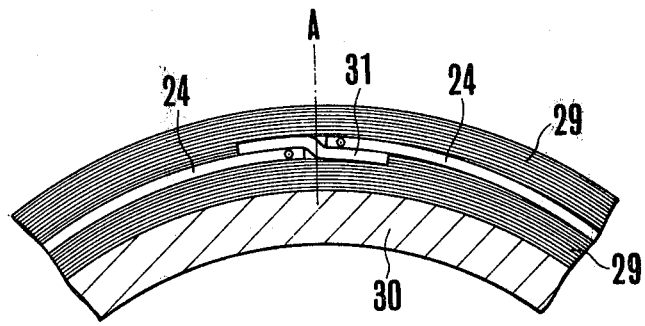
FIG. 3 is a cross-section view showing manufacturing process of the sheet shaped shrinkage cover.

A heat shrinkable cover 10 provided with tongues at the opposite ends can be prepared as follows:

While a heat shrinkable film 29 is wrapped about a drum 30 to form a lamination, as shown in FIG. 3, the sheet shaped or wire net shaped heating elements 24 are interposed between predetermined turns of the lamination and release paper strip 31 is also interposed between the predetermined turns. After wrapping, the assembly is heated to obtain an integral cylindrical lamination and then the cylindrical lamination is cut at the portions A where the release paper strip had been interposed. After cutting, the release paper strip is removed. In the present state, a pair of two tongues are provided on the opposite ends of the integral lamination. Then, a bonding agent 26 is coated on one surface of the integral lamination and bonding agents 27, 28 further coated on opposed inner surfaces of the pair of tongues. In this case, the bonding agents 27, 28 may be coated on only one of the opposed inner surfaces.

An example of the method of preparing the heat shrinkable cover of this invention will not be described in the following.

EXAMPLE

Cross-linked polyethylene films each having a thickness of 150 microns, a width of 700 mm and a length of 1950 mm were laminated one upon another and heat fused. A coated wire comprising a strand of 16 copper wires each having a diameter of 0.08 mm was interposed at the predetermined turn of the lamination to obtain a cover having tongues at the opposite ends as shown in FIG. 1. The coated wire was divided into 6 sections with taps between adjacent sections thus connecting in parallel the divided sections. At each end section the heating wire extends through one of the tongues from the main body of the synthetic resin member. Further, such sections have the same resistance value each another. One surface of the cover was coated with a 1 mm thick sheet of heat-sensitive anticorrosive bonding agent made of butyl rubber composition.

The resulting cover was wrapped, with the bonding agent layer inside, about a steel pipe having an outer diameter of about 610 mm, and two tongues at the opposite ends were superposed one upon another as shown in FIG. 2 and an adhesive tape was applied onto the laminated tongues to temporarily hold them. Then current was passed through the parallelly connected sections to cause the cover to heat shrink. After stopping the current, the cover was cooled and the joint of the cover was cut and examined. It was noted that the adhesive applied to respective tongues was melted to completely fill the gaps between the tongues for integrally bonding them. Also the bonding agent applied to the main body of the cover flowed to form a water tight sealing between the cover and the steel tube.

As a control, a sample in which an electric heater was embedded in tongue 23b instead of tongue 23a was tested. It was noted that, considerably before the desired temperature of body portion was reached, tongues 23b and 23c were overheated to cause the bonding agent to flow out or the tongues underwent pyrolysis, thus failing to make a perfect and strong joint.

It should be noted that the invention is not limited to the specific examples described above and that many changes and modifications would be obvious to one skilled in the art. For example, in addition to the joints between pipes or cables, the heat shrinkable synthetic resin cover of this invention can also be used to reduce the size of an opening of a pipe or to prevent an electric cable or wire from contacting other member.

What is claimed is:

1. A heat shrinkable synthetic resin cover of the type comprising a heat shrinkable synthetic resin member, a flexible electric heating member made of a conductor coated with a cross-linked polymer being embedded in the heat shrinkable synthetic resin member having heat shrinkability in a substantially one direction that the electric heating member does not preclude heat shrinkage of the heat shrinkable synthetic resin member in said direction, characterized in that said heat shrinkable synthetic resin member is a rectangular sheet, and that said rectangular flat sheet shaped heat shrinkable synthetic resin member is provided with at least two tongues extending along entire length of one end edge of said resin member, said one end edge being substantially perpendicular to said direction of heat shrink of said heat shrinkable synthetic resin member.

2. The heat shrinkable synthetic resin cover according to claim 1 wherein said rectangular shaped heat shrinkable synthetic resin member is further provided with at least two tongues on one of the opposite end edges of said resin member.

3. The heat shrinkable synthetic resin cover according to claim 2 wherein said heating member is contained in a body portion of said heat shrinkable synthetic resin member, in an upper one of said two tongues on one of said end edges, and in a lower one of said two tongues on the opposite end edge.

4. The heat shrinkable synthetic resin cover according to claim 1 wherein a bonding agent layer is further provided on one surface of said heat shrinkable synthetic resin member.

5. The heat shrinkable synthetic resin cover according to claim 4 wherein said bonding agent layer is of a heat sensitive composition.

6. The heat shrinkable synthetic resin cover according to claim 5 wherein said heat sensitive composition is crosslinkable.

7. The heat shrinkable synthetic resin cover according to claim 1 or 3 wherein a bonding agent layer is further provided on the inner surface of either one of said opposing tongues.

* * * * *